(12) United States Patent
Kinoshita et al.

(10) Patent No.: US 6,875,144 B2
(45) Date of Patent: Apr. 5, 2005

(54) RUBBER COMPOSITION, A METHOD OF MAKING THE RUBBER COMPOSITION, A POWER TRANSMISSION BELT MADE FROM THE RUBBER COMPOSITION AND A METHOD OF MAKING THE POWER TRANSMISSION BELT

(75) Inventors: Takashi Kinoshita, Hyogo (JP); Keiji Takano, Berlin (DE); Takeshi Kimura, Hyogo (JP); Sumiko Takeuchi, Osaka (JP); Tsuyoshi Takehara, Hyogo (JP)

(73) Assignee: Mitsuboshi Belting, Ltd., Kobe (JP)

( * ) Notice: Subject to any disclaimer, the term of this patent is extended or adjusted under 35 U.S.C. 154(b) by 160 days.

(21) Appl. No.: 10/058,725

(22) Filed: Jan. 28, 2002

(65) Prior Publication Data

US 2003/0027920 A1 Feb. 6, 2003

(30) Foreign Application Priority Data

| Jan. 26, 2001 | (JP) | 2001-019135 |
| Aug. 21, 2001 | (JP) | 2001-250449 |
| Jan. 15, 2002 | (JP) | 2002-006584 |

(51) Int. Cl.$^7$ ............................................... F16G 5/04
(52) U.S. Cl. ............................................ 474/260; 263/265
(58) Field of Search ............................. 524/508; 474/260, 474/263, 265

(56) References Cited

U.S. PATENT DOCUMENTS 4,898,924 A * 2/1990 Chenevey et al. .......... 528/183

FOREIGN PATENT DOCUMENTS

| JP | 06287866 | 10/1994 |
| JP | 2001-3994 | 1/2001 |

* cited by examiner

Primary Examiner—Robert D. Harlan
(74) Attorney, Agent, or Firm—Wood, Phillips, Katz, Clark & Mortimer

(57) ABSTRACT

A method of making a rubber composition. The method includes the steps of: providing fibers of a desired length; treating the fibers with a treating liquid made up of a nitrile rubber-modified epoxy resin and an alkylphenol•formaldehyde resin; and dispersing the treated fibers in rubber.

13 Claims, 3 Drawing Sheets

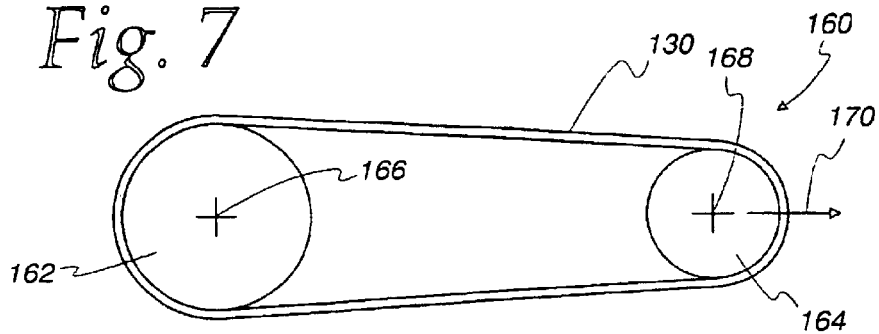
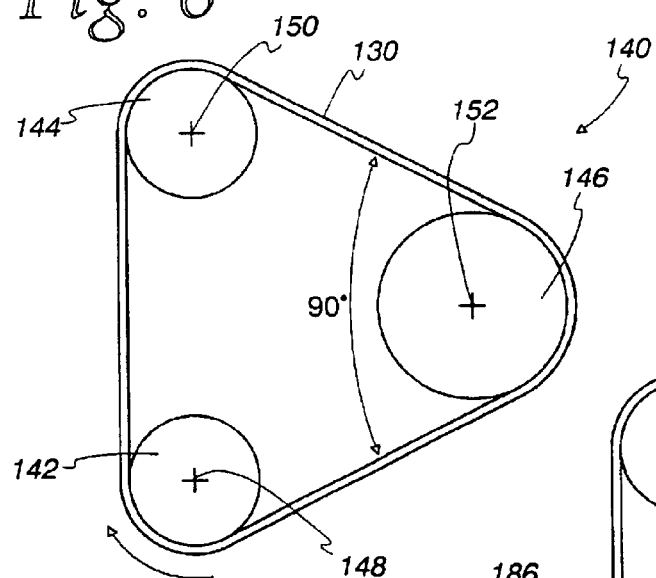
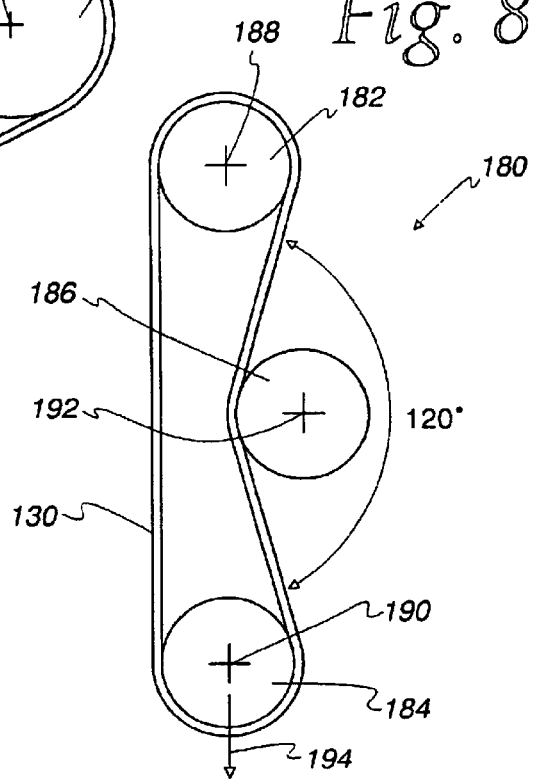

RUBBER COMPOSITION, A METHOD OF MAKING THE RUBBER COMPOSITION, A POWER TRANSMISSION BELT MADE FROM THE RUBBER COMPOSITION AND A METHOD OF MAKING THE POWER TRANSMISSION BELT

BACKGROUND OF THE INVENTION

1. Field of the Invention

This invention relates to rubber compositions having short fibers dispersed therein. The invention is also directed to power transmission belts made with the rubber composition and to a method for making the rubber composition and power transmission belts.

2. Background Art

The number of uses for rubber parts and the demands on these parts, particularly in the automotive industry, have increased over the years. Designers of rubber products, including power transmission belts, have striven to make these products capable of surviving in severe environments while meeting demanding performance criteria.

The nature of rubber products is generally determined by the raw material rubber and particular compounding ingredients used with the rubber. Recently, there has been a trend towards dispersing short fibers in the rubber to enhance the properties thereof, namely reinforcing properties, abrasion resistance, etc.

In the automotive industry, power transmission belts are now utilized on engines to convey power to and from different auxiliary equipment, such as air compressors, alternators, etc. By embedding short fibers, such as those made from cotton, nylon, Vinylon, rayon, aramid, etc., in a widthwise orientation in rib portions, side pressure resistance of the driving/driven portions of the belt can be enhanced. Further, by projecting the short fibers from the exposed side surfaces of the belt, desired frictional characteristics may be selected. Additionally, the projecting fibers may be incorporated so as to control sound generation due to sticking between the belts and cooperating pulleys in use.

Belt durability may be improved, particularly by enhancing abrasion resistance at the drive/driven surfaces, by incorporating short aramid fibers and projecting these fibers from the side surfaces of the belt which contact cooperating pulleys in use. Japanese Patent Laid-Open No. 164839/1989 discloses power transmission belts of this type with the incorporation of aramid fibers for enhancing belt durability. In that document, the aramid fibers are described to project to the side wall surfaces on the compression rubber layer of the belt at locations which contact cooperating drive/driven pulley surfaces. However, when the aramid fibers projecting from the belt surfaces are broken off, rigid, aramid fiber portions may remain exposed. During operation, these rigid fiber portions may generate a jarring rubbing sound as they contact cooperating pulleys.

Power transmission belts in the automotive industry are commonly subjected to severe operating conditions. This is particularly true of belts used in engines with speed changing systems. Belts of this type are commonly incorporated into engines having a large capacity. Further, the conditions are often made even more severe by current designs which cater to social demands for energy savings and compacting of engine compartments. Belts in this environment are required to exhibit excellent abrasion resistance, compression resistance, and resistance to flexing fatigue. Often, in these severe environments, even aramid fibers, which are recognized to have excellent abrasion resistance, may be inadequate to meet operating demands.

The power transmission belt industry is constantly looking for belt designs capable of effectively operating for long periods under the extreme conditions encountered in the automotive industry, and elsewhere.

It is known to treat short reinforcing fibers dispersed in rubber to improve characteristics of a rubber composition. Japanese Patent Publication No. 24131/1985 discloses a method of treating fibers using an RFL liquid having a carboxyl group-containing acrylonitrile-butadiene rubber latex. Japanese Patent Publication Nos. 41525/1993, 41526/1993, and 41527/1993 disclose methods of treating short fibers with an adhesive composition containing RFL liquid, a halogen-containing polymer, and an active compound selected from an isocyanate compound, an epoxy compound, and a silane coupling agent, as main constituents. Japanese Patent Publication No. 41528/1994 discloses a method whereby short fibers are first treated with an epoxy compound or an isocyanate compound, thereafter treated with RFL liquid, and thereafter further treated with a rubber paste that is made by dissolving a rubber compound and chlorinated rubber in a solvent.

However, using the above treating techniques with poly (paraphenylene benzobisoxazole) short fibers (PBO short fibers) has been found by the inventors herein not to produce the rubber composition characteristics required in certain operating environments. Further, the PBO short fibers, so treated, may not have desired dispersing qualities. If the dispersion of the fibers is not uniform, the rubber composition is prone to cracking. This problem results from the fact that the PBO fibers, treated in the above manner, by reason of their molecular structure, generally do not have the degree of adhesion with rubber as do other commonly used fibers. Further, by requiring the post-treatment use of RFL liquid, increased labor, time, and cost may be associated with manufacture.

SUMMARY OF THE INVENTION

In one form, the invention is directed to a method of making a rubber composition. The method includes the steps of: providing fibers of a desired length; treating the fibers with a treating liquid made up of a nitrile rubber-modified epoxy resin and an alkylphenol•formaldehyde resin; and dispersing the treated fibers in rubber.

The step of providing fibers may involve cutting filaments to form fibers of a desired length.

The filaments may be treated with the treating liquid before the filaments are cut to form the fibers.

The method may further involve treating the fibers with an RFL liquid.

In one form, the weight ratio of alkylphenol•formaldehyde resin to nitrile rubber-modified resin is from 2/10 to 10/10.

In one form, the fibers are poly(para-phenylene benzobisoxazole) fibers.

The fibers may be present in an amount of 1–40 parts by weight per 100 parts by weight of the rubber.

In one form, the fibers have a length of 1–20 mm.

The method may further include the steps of dispersing aramid fibers in the rubber.

In one form, the method involves incorporating the rubber composition into a power transmission belt.

In one form, the power transmission belt has a body with a length. The body has a cushion rubber layer with load carrying cords embedded therein and extending lengthwise of the body. The body further has a compression rubber layer defined at least in part by the rubber composition.

In another form, the power transmission belt is a V-ribbed belt having a body with a length. The body has a cushion rubber layer with load carrying cords embedded therein and extending lengthwise of the body. The body further has a compression rubber layer with a plurality of ribs formed therein and extending lengthwise of the body.

In one form, the compression rubber layer is defined at least in part by the rubber composition.

In one form, the power transmission belt is a V-belt having a body with a length. The body has a compression rubber layer with load carrying cords embedded therein and extending lengthwise of the body. The body has a compression layer.

In one form, the compression layer is defined at least in part by the rubber composition.

The invention is also directed to a power transmission belt having a body made at least in part of rubber. Fibers of poly(para-phenylene benzobisoxazole) are dispersed in the rubber.

The fibers may have a length of 1–20 mm.

In one form, the fibers are present in an amount of 1–40 parts by weight per 100 parts by weight of the rubber.

The body may further include aramid fibers dispersed in the rubber.

In one form, the fibers are treated with a treating liquid which includes nitrile rubber-modified epoxy resin and an alkylphenol•formaldehyde resin.

The fibers may be treated with an RFL liquid.

The power transmission belt may be a V-ribbed belt, a V-belt, or any other type of known belt type.

In one form, the power transmission belt has a compression rubber layer and the fibers are dispersed in the rubber in the compression rubber layer.

The invention is further directed to a composition consisting of rubber and fibers of poly(para-phenylene benzobisoxazole) dispersed in the rubber. The fibers may be dispersed in an amount of 1–40 parts by weight per 100 parts by weight of rubber.

In one form, the fibers have a length of 1–20 mm.

The body may further have aramid fibers dispersed in the rubber.

In one form, the fibers are treated with a treating liquid consisting of nitrile rubber-modified epoxy resin and an alkylphenol•formaldehyde resin.

The fibers may be treated with an RFL liquid.

BRIEF DESCRIPTION OF THE DRAWINGS

FIG. 6 is a schematic representation of a system for dynamically measuring friction loss of a belt;

FIG. 7 is a schematic representation of a system for dynamically measuring the time at which crack generation occurs in a belt; and FIG. 8 is a schematic presentation of another system for dynamically measuring the time at which cracks generation occurs in a belt.

DETAILED DESCRIPTION OF THE DRAWINGS

Figure 1:
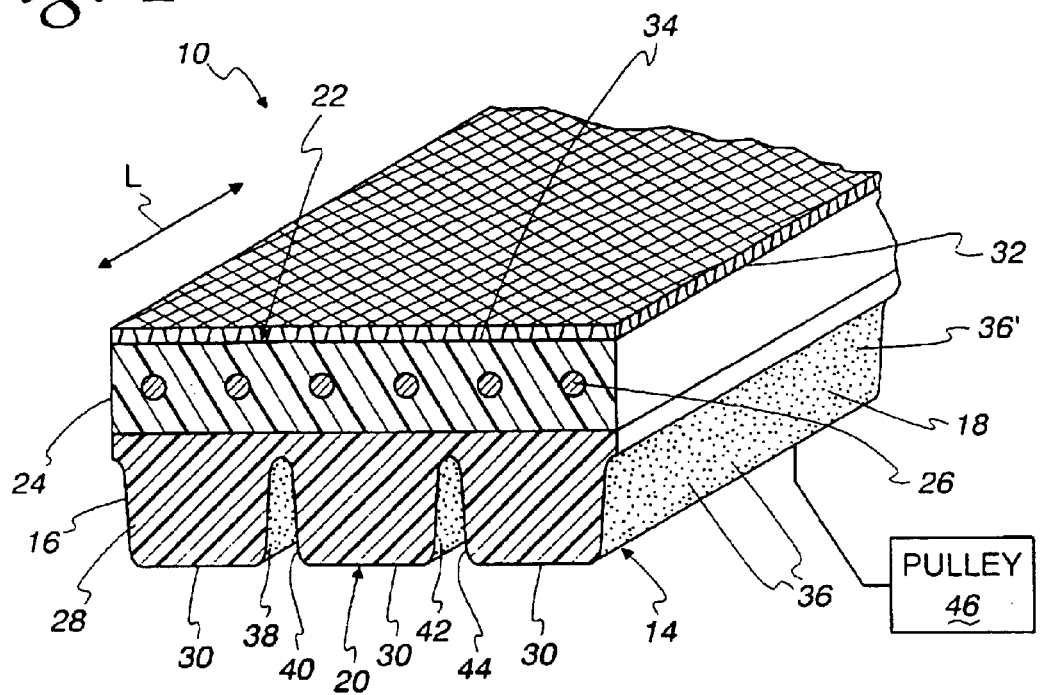
FIG. 1 is a cross-sectional, fragmentary, perspective view of a V-ribbed belt incorporating a rubber composition, according to the present invention.
Figure 2:
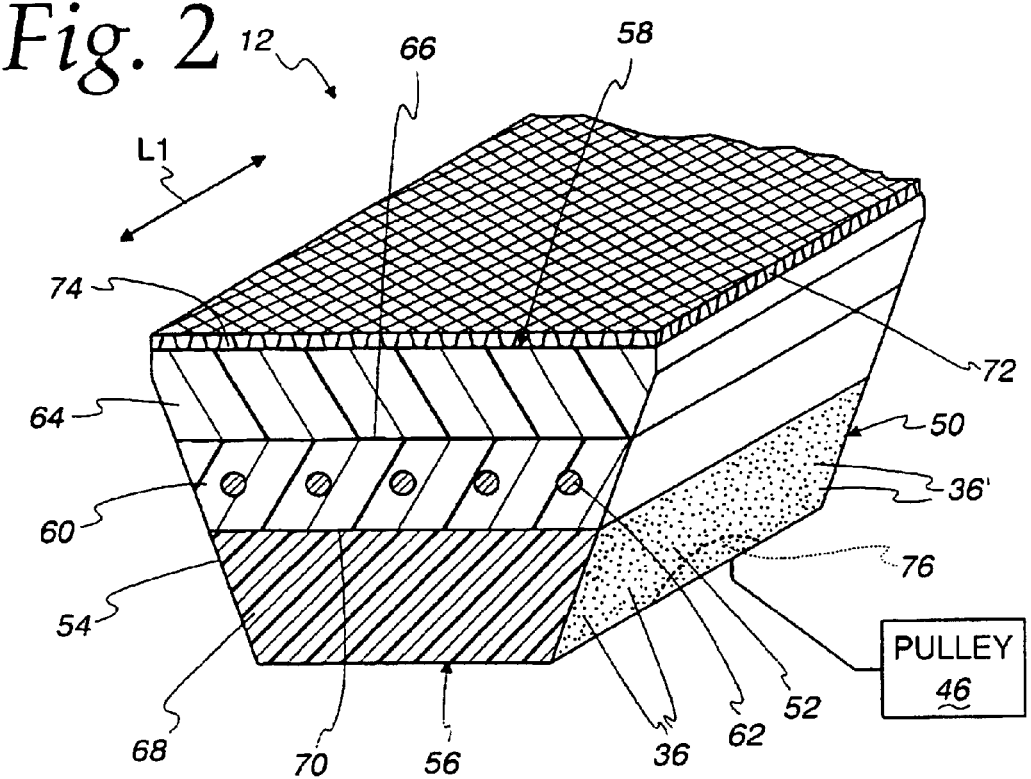
FIG. 2 is a view as in FIG. 1 of a conventional V-belt incorporating a rubber composition, according to the present invention.

One aspect of the invention is the utilization of poly(para-phenylene benzobisoxazole) fibers (hereinafter PBO fibers) in a rubber composition useable, for example, in power transmission belts of the type shown in FIGS. 1 and 2. In FIG. 1, a conventional V-ribbed belt is shown at 10. In FIG. 2, a conventional V-belt is shown at 12. The invention could be used to form other types of power transmission belts that are not disclosed herein, in similar manner. Further, the invention is not limited to utilization in the power transmission belt environment.

PBO fibers are obtained by spinning a polymer which is attained by polycondensating diaminoresorcin and terephthalic acid in a polyphosphoric acid solvent. Generally, PBO fibers have some properties that make them preferable to conventionally used fibers. For example, in a mechanical sense, the PBO fibers generally have higher strength and a higher elastic modulus than aramid fibers. Further, PBO fibers may exhibit a greater resistance to breaking than aramid fibers.

By making a rubber composition with dispersed PBO short fibers, good reinforcing properties and abrasion resistance may be realized. Also, since the breaking resistance of the PBO fibers is generally greater than aramid fibers, a more significant effect may be realized from projecting PBO short fibers outwardly beyond the pulley engaging surfaces of the belt than can be realized with short aramid fibers. By reason of the PBO short fibers remaining intact, noise generated between the cooperating belt and pulley surfaces during operation may be effectively suppressed by the protruding fibers over longer periods than can be accomplished through conventionally used fibers. Further, good belt durability may be achieved.

However, since the PBO fibers do not contain a substantial functional group, adhesion of these fibers to rubber is difficult when compared to conventionally used short fibers. Accordingly, a special adhesion treatment is required to produce the necessary bonding between the PBO fibers and the rubber in which they are dispersed.

Through intensive investigation, the inventors herein developed an adhesion treatment for PBO fibers that produces the required adhesion between the fibers and rubber in which the fibers are dispersed. As explained below, the adhesive treatment of the fibers enhances the dispersability of the fibers in rubber and enhances adhesion of the fibers to the rubber. That adhesion treatment will now be described.

Initially, filaments are dipped into a treating liquid at room temperature. The treating liquid is made up of a nitrile rubber-modified epoxy resin, an alkylphenol•formaldehyde resin, a crosslinking agent, and a solvent. The filaments are dipped in the treating liquid for approximately 0.5 to 30 seconds and then dried by passage through an oven maintained at a temperature of from 150° to 250° C. for approximately 1–5 minutes. Through the treatment, the treating liquid permeates to the inside of the filaments to improve the adhesive properties of the fibers.

It has been found that to promote good workability, adhesion, and dispersability of the short fibers in a rubber component, it is preferred that the solid component concentration of the treating liquid be controlled to be from 1–20% by weight. Suitable exemplary solvents are aromatic hydrocarbons such as toluene, xylene, etc. or aliphatic ketones, such as methyl ethyl ketone, etc.

The nitrile rubber-modified epoxy resin is an epoxy prepolymer obtained by modifying an epoxy resin having at least two epoxy groups in the molecules with a nitrile rubber. As the epoxy base, a reaction product of glycerol or propylene glycol and a halogen-containing epoxy compound such as epichlorohydrine, etc., or the reaction product of a polyhydric phenol such as hydroquinone, bisphenol A, etc., and a halogen-containing epoxy, is used. A reaction product using a bisphenol A type epoxy resin having two terminal epoxy groups is desirable.

The alkylphenol•formaldehyde resin is a resin obtained by condensing one, two, or more, kinds of monohydric phenol such as phenol, cresol, chlorophenol, etc., and polyhydric phenols such as resorcin, catechol, etc., and one, two, or more, kinds of aldehydes such as formaldehyde, acetaldehyde, etc., in the presence of an acid catalyst or an alkali catalyst.

It is preferred that a weight ratio of the above-described alkylphenol•formaldehyde resin to nitrile rubber-modified epoxy resin be from 2/10 to 10/10. If the weight ratio is less than 2/10, the adhesive properties of the rubber may be lower than desired. If the weight ratio exceeds 10/10, the adhesive property with rubber may be unacceptably lowered. Further, the flexibility of the treating agent may be lowered, potentially resulting in the undesired lowering of the pliability of the short fibers.

For the crosslinking agent, tertiary amines, imidazole, acid anhydrides, etc. are used. Of the above, tertiary amines are preferred. The crosslinking agent is usually present in the range of 3–30% by weight to the epoxy resin.

Post treatment may, but need not, be carried out. The fibers exhibit good adhesion and dispersability even without the post-treatment. Post-treatment is as follows. The fibers impregnated with the above-described treating liquid are further treated with an RFL liquid obtained by mixing a resorcin•formalin initial condensate product and rubber latex. A molar ratio of resorcin to formalin is preferably from 3/1 to 1/3 to produce the desired adhesive properties.

For purposes of increasing adhesive effect resulting from the use of RFL liquid, it is preferred that, in the RFL liquid, the solid component weight ratio of resorcin•formalin initial condensate to rubber latex be from 1/1 to 1/5. Further, it is desired that the amount of solid attaching component of the RFL liquid be from 3–10% by weight.

If the solid component weight ratio exceeds 1/1, the cohesive force of the short fibers may become so large so as to reduce dispersability. If the ratio becomes less than 1/5, the adhesive force between the short fibers and a rubber in which the fibers are dispersed may be lowered. The tensile strength of the fibers may also be lowered.

Additionally, if the solid attaching component of the RFL liquid exceeds 10% by weight, the treating liquid may become firm, as a result of which the filaments of the short fibers may be difficult to separate from each other. If the attached solid component is less than 3% by weight, the desired improvement of dispersability and tensile strength by the RFL liquid may not be adequately realized.

Additionally, the rubber latex may include latexes such as a styrene-butadiene-vinylpyridine ternary copolymer, chlorosulfonated polyethylene, hydrogenated nitrile rubber, epichlorohydrin, natural rubbers, SBR, chloroprene rubber, an olefin-vinyl ester copolymer, EPDM, etc.

The temperature of the treating liquid during the adhesion treatment is controlled to be from 5–40° C. Dipping time is from 0.5 to 30 seconds. The filaments are subjected to heat treatment by passage through an oven maintained at a temperature of from 200–250° C. for from 1–3 minutes.

In addition to the above treatment, an overcoat treatment may be applied. The filaments may be dipped as in a rubber paste dissolved in a solvent. The solvent may be selected from aromatic hydrocarbons such as toluene, xylene, etc., and aliphatic ketones such as methyl ethyl ketone, etc. The dipping time is preferably from 0.5 to 30 seconds, with heat treatment carried out by passage through an oven maintained at a temperature from 80 to 200° C. for from 1 to 3 minutes.

At the conclusion of the treatment(s), as described above, the filaments are cut to produce short fibers of a desired length. PBO short fibers are preferably cut to a length from 1–20 mm. The fibers preferably have a diameter of from 1–3 denier.

Short fibers obtained by treating filament yarns with pre-treatment liquid containing an epoxy resin, in place of the nitrile rubber-modified epoxy resin, can be dispersed in a rubber composition. In this case, however, a post-treatment with RFL liquid becomes important. Generally, the adhesive force through this process is not as good as that which results from treatment using a treating liquid containing the nitrile rubber-modified epoxy resin.

While the above adhesive treatment has been described with respect to PBO fibers, it is useable likewise to treat other fibers, such as cotton, nylon, Vinylon, rayon, aramid, etc.

The rubber composition, resulting from the compounding of the rubber with adhesive-treated short fibers dispersed therein, can be used in many different environments. It has been discovered that power transmission belts incorporating the inventive rubber composition exhibit good abrasion resistance and resistance to flexing fatigue. The use of the same in power transmission belts will now be described.

In FIG. 1, the V-ribbed belt 10 has a body 14 with an endless length, as indicated by the double-headed arrow L. The body has laterally oppositely facing sides 16, 18, an inside/outside 20 and an outside/inside 22. The body has a cushion rubber layer 24 with load carrying cords 26 embedded therein and extending lengthwise of the body 14. The body further has a compression rubber layer 28 within which a plurality of laterally spaced ribs 30, in this case three, are formed. The ribs 30 extend continuously in a lengthwise direction. A fabric layer 32 is applied to the exposed outside/inside surface 34 of the cushion rubber layer 24.

The fabric layer 32 is a canvas selected from textiles, knit materials, and non-woven fabrics. The fabric is made from fiber material, for example natural cotton such as cotton, hemp, etc.; inorganic fibers such as metal fiber, glass fiber, etc.; and organic fiber, such as fibers of polyamide, polyester, polyethylene, polyurethane, polystyrene, polyfluoroethylene, polyacrylate, polyvinyl alcohol, whole aromatic polyesters, aramid, etc.

The fabric layer 32 is dipped in a resorcin-formalin-latex liquid (RFL liquid). Thereafter, the fabric layer 32 is friction treated by with an unvulcanized rubber. Alternatively, after dipping, the fabric layer 32 is subjected to a dipping treatment with a soaking liquid formed by dissolving a rubber in a solvent. Additionally, the RFL solution may be mixed with an appropriate carbon black liquid to blacken the fabric layer 32 and/or a known surface active agent may be added to the RFL liquid in an amount of from 0.1 to 5.0% by weight.

The compression rubber layer may be made from any of a natural rubber, a polyisoprene rubber, a polybutadiene rubber, a styrene-butadiene copolymer rubber, a chloroprene rubber, an ethylene-α-olefin-base copolymer rubber such as an ethylene-propylene rubber, etc., a nitrile rubber (NBR), a hydrogenated nitrile rubber (H-NBR) to which is added an unsaturated carboxylic acid metal salt, an alkylated chlorosulfonated polyethylene (ACSM), a chlorosulfonated polyethylene rubber (CSM), etc., as the main constituent, to which is added a reinforcing agent such as carbon black, a filler, a softening agent, an antioxidant, a vulcanizing aid, or a vulcanizing agent such as sulfur, an organic peroxide, etc.

The cushion rubber layer 24 may be made from the same kind of rubber as is in the compression rubber layer 28. It is preferred that short fibers 36 not be mixed in the cushion rubber layer 24. However, if necessary, additives commonly used for rubber compounding such as a reinforcing agent such as carbon black, silica, etc., a filler such as calcium carbonate, talc, etc., a plasticizer, a stabilizer, a processing aid, a coloring agent, etc., may be used.

Preferably, the compression rubber layer 28 has the PBO short fibers 36, previously subjected to the adhesive treatment, dispersed therein. Further, the short fibers 36 are projected to the exposed side surfaces 16, 18 of the belt, as well as to the remaining pulley-engaging surfaces 38, 40, 42, 44 of the ribs 30. Any exposed fibers 36 at the surfaces 16, 18, 38, 40, 42, 44 lower the friction coefficient between the rubber in the compression rubber layer 28 and cooperating pulley 46. As a result, noise generation between the belt 10 and pulley 46 during operation may be suppressed. Further, since the mechanical properties of the short fibers 36 are good, the belt becomes effectively reinforced. Further, the belt shows good abrasion resistance.

It is preferred that, with the angle between the vertical direction and lengthwise direction of the belt being 90°, the short fibers 36 be oriented in the range of 70° to 110°. The PBO fibers 36 have good elongation properties in the right-angle direction and thus account for good flex fatigue resistance, which may be greater than the flex fatigue resistance realized using conventional short aramid fibers.

Generally, it is preferred that the PBO fibers 36 have a length of from 1–20 mm and be present in an amount from 1 to 40 parts by weight to 100 parts by weight of the rubber. To give the desired advantages described above, in a V-ribbed belt, it is preferred that the fiber length be from 1 to 10 mm and that the fibers be present in an amount of 1 to 30 parts by weight per 100 parts by weight of the rubber. More preferably, the fiber lengths are from 1–5 mm and the fiber is present in an amount of 5 to 20 parts by weight.

If the PBO fibers 36 are present in an amount of less than 1 part by weight, there may be a tendency of the rubber in the compression rubber layer 28 to stick at the pulley 46 and thereby become abraded during use. If the amount exceeds 30 parts by weight, the fibers 36 may not be uniformly dispersed in the rubber and as a result there is a tendency for cracks to form.

It is not required that the PBO fibers 36 be used exclusively in the rubber composition. Use of short fibers 36' of other materials are contemplated. For example, it is often desirable that aramid fibers be used, depending upon the abrasion resistance and reinforcement required for the rubber composition. Intermixing aramid fibers may contribute to the performance characteristics of the rubber composition without adding significantly to cost.

To prepare the rubber composition incorporating the PBO short fiber, kneading of a master batch is carried out using 100 parts by weight of rubber and from 1 to 40 by weight of short fiber, together with 1 to 10 parts by weight of a softening agent. These components are placed in a closed-type kneader, such as a Banbury mixer, and kneaded. Thereafter, the kneaded master batch is removed from the mixer and cooled to a temperature of 20–50° C. to prevent scorching of the rubber.

The manner of kneading is not limited to that described above, nor is kneading limited to the use of a Banbury mixer, rolls, a kneader, an extruding machine, etc. The mixture can be kneaded in any manner known to those skilled in the art.

Also, the vulcanizing process is not limited to the use of a particular apparatus or method. The mixture may be vulcanized by a vulcanizing apparatus, such as by mold heating, hot air heating, a rotary drum-type vulcanizer, an injection molding machine, etc.

To form the load carrying cords 26, polyester fibers, aramid fibers, glass fibers, or the like, may be used. The total denier of each load carrying cord 26 is preferably from 4,000 to 8,000. The load carrying cords 26 are subjected to adhesive treatment. Suitable cords 26 are obtained by twisting polyester fiber filament made of ethylene-2,6-naphthalate as the main structural unit. This is preferred since, through use of these cords 26, belt slip rate can be controlled to afford a belt with long life. The final twist number for the load carrying cords 26 is from 10 to 23 per 10 cm, with the initial twist being from 17 to 38 per 10 cm.

If the total denier is less than 4,000, the modulus and strength of the load carrying cords 26 may be unacceptably low. If the total denier exceeds 8,000, the overall thickness of the belt 10 may become increased to the point that flexing fatigue is unacceptably high.

Ethylene-2,6-naphthalate is normally synthesized by condensation polymerizing naphthalene-2,6-dicarboxylic acid, or the ester-forming derivative thereof, and ethylene glycol, in the presence of a catalyst, under appropriate conditions. Before completing polymerization of ethylene-2,6-naphthalate by adding one, two, or more kinds of a third component, a copolymer polyester is synthesized.

The load carrying cords 26 are subjected to adhesive treatment to improve adhesive properties with respect to rubber. Preferably, after dipping the fibers in a resorcin-formalin-latex (RFL) liquid, the fibers are dried so as to uniformly form the adhesive layer on the surfaces thereof. However, the adhesive treatment is not limited to this method. For example, the fibers may be treated with RFL liquid after pretreatment with an epoxy compound or an isocyanate compound.

The pitch between adjacent wraps of load carrying cords 28 is preferably 1.0 to 1.3 mm. This produces a belt having a high modulus. If the wrapping pitch is less than 1.0 mm, the cords 26 may laterally overlap, which inhibits wrapping. If the pitch exceeds 1.3 mm, the modulus may be lowered beyond what is acceptable.

A process for making the V-ribbed belt 10 in FIG. 1 will now be described. Initially, the fabric layer 32 is wound around a cylindrical molding drum (not shown). The cushion rubber layer 24 is thereafter wrapped around the fabric layer 32, followed by wrapping of the load carrying cords 26 and the compression rubber layer 28. A sleeve pre-form results. The sleeve pre-form is then vulcanized.

The vulcanized sleeve is trained around two rolls and driven under a predetermined tension. A rotating grinding wheel is brought into contact with the sleeve so as to grind 3 to 100 grooves, to produce the desired configuration of rib 30.

Once the sleeve is ground, it is removed from the first set of rolls and trained around another set of rolls. The sleeve is again driven and cut with an appropriate cutter to obtain individual V-ribbed belts 10 of desired width.

The V-belt 12 in FIG. 2 has a body 50 with a length extending in the direction of the double-headed arrow L1. The body 50 has laterally oppositely facing side surfaces 52, 54 and an inside/outside 56 and an outside/inside 58. The body has a cushion rubber layer 60 in which laterally spaced, load carrying cords 62 are embedded. A tension rubber layer 64 is applied to one surface 66 of the cushion rubber layer 60. A compression rubber layer 68 is applied to the oppositely facing surface 70 of the cushion rubber layer 60. A fabric layer 72 is laminated to the exposed surface 74 of the tension rubber layer 64. Optional cogs 76 may be formed in the compression rubber layer 68 at regularly spaced internals along the length thereof.

The compression rubber layer 68 is preferably made with 5 to 40 parts by weight, and more preferably 10 to 30 parts by weight of PBO short fibers 36, as described above. For each layer of the belt 12, the same rubber as described for the V-ribbed belt 10 can be used.

The effectiveness of the invention will now be explained with respect to testing and comparative testing that was carried out by the inventors.

Comparison of Adhesion Treatment of Short Fibers

INVENTIVE EXAMPLE 1

After dipping PBO fibers in the form of filaments having 1,100 dtex/667 filaments in the treating liquid A of Table 1, below, the fibers were heat-treated at 200° C. for one minute.

TABLE 1

| Compounding Agents | Treatment Liquid A | Treatment Liquid B |
|---|---|---|
| NBR-Modified Epoxy Resin*[1] | 100 | — |
| Epoxy Resin*[2] | — | 100 |
| Alkylphenol · Formaldehyde Resin*[3] | 60 | 60 |
| Tertiary Amine*[4] | 7.6 | 7.6 |
| Toluene | 3184.4 | 3184.4 |

*[1]Struktol Polydis 3604
*[2]Epikote 828
*[3]Tackirol 101
*[4]Daitocurar HDACC43

The fibers were then dipped in the RFL liquid shown in Table 2, below, and heat treated at 200° C. for one minute.

TABLE 2

| Compounding Agents | Weight Ratio |
|---|---|
| Vinylpyridine Latex (40%) | 244.0 |
| Resorcin | 11.0 |
| 37% Formalin | 16.2 |
| Sodium Hydroxide | 0.3 |
| Water | 299.5 |
| Sum Total | 571.0 |

The treated fiber filaments were then cut to a length of 3 mm, with the fiber diameter being 1.7 dtex.

INVENTIVE EXAMPLE 2

PBO fibers, in the form of 1,100 dtex/667 filaments, were dipped in the treating liquid A, as shown in Table 1, above. The fibers were heat-treated at 200° C. for one minute. The treated filaments were then cut to produce individual fibers having a length of 3 mm, with the fiber diameter being 1.7 dtex.

COMPARATIVE EXAMPLE 1

PBO fibers, in the form of 1,100 dtex/667 filaments, were dipped in the treating liquid B shown in Table 1, above. The fibers were heat-treated at 200° C. for one minute. The fibers were then dipped in the RFL liquid shown in Table 2, above, and heat treated at 200° C. for one minute. The filaments were then cut to produce individual fibers having a length of 3 mm, with the fiber diameter being 1.7 dtex.

COMPARATIVE EXAMPLE 2

PBO fibers, in the form of 1,100 dtex/667 filaments, were dipped in the treating liquid B, shown in Table 1, above. The fibers were heat-treated at 200° C. for one minute. The filaments were then cut to a length of 3 mm, with the fiber diameter being 1.7 dtex.

COMPARATIVE EXAMPLE 3

PBO fibers, in the form of 1,100 dtex/667 filaments, were cut to a length of 3 mm, with the fiber diameter being 1.7 dtex.

The above short fibers were kneaded using a Banbury mixer in the compounding ratio shown in Table 3, below, and processed by rolls to obtain rubber sheets having a thickness of 1 mm.

TABLE 3

| Compounding Agents | Weight Ratio |
|---|---|
| Chloroprene Rubber*[5] | 100 |
| Shot Fibers | Definite Amount |
| Naphthene-base Oil | 5 |
| Stearic Acid | 1 |
| Magnesium Oxide | 4 |
| Carbon Black | 40 |
| Antioxidant*[6] | 2 |
| Zinc oxide | 5 |
| Vulcanization Accelerator*[7] | 0.25 |

*[5]M-40: Made by Denki Kagaku Kogyo K.K.
*[6]Octylated diphenylamine
*[7]2-Mercaptoimidazoline The amount of short fibers was 15 parts by weight to 100 parts by weight of rubber. The short fibers were oriented to the extruding direction of the rubber by a roll. The rubber sheets were placed in a mold and vulcanized at 153° C. for 20 minutes. The properties of the resulting rubber composition were then measured.

Friction Testing

A DIN friction test was carried out according to JIS K6264. The samples were prepared so that the short fibers were oriented vertically to the friction surface. The measured results are shown in Table 4, below.

TABLE 4

|  | Inventive Example | | Comparative Example | | |
|---|---|---|---|---|---|
|  | 1 | 2 | 1 | 2 | 3 |
| Treatment Liquid (Tr. Liquid) | Tr. Liquid A + RFL Tr. Liquid | Tr. Liquid A | Tr. Liquid B + RFL Tr. Liquid | Tr. Liquid B | — |
| Grain Parallel Tensile Strength (Mpa) | 21.3 | 21.0 | 13.6 | 13.4 | — |
| Grain Right-Angle Tensile Strength (Mpa) | 11.5 | 11.6 | 11.5 | 11.3 | — |
| Tensile Strength Ratio (parallel right angle) | 1.85 | 1.81 | 1.18 | 1.19 | — |
| Dispersability | 0 | 0 | 0 | 0 | X |
| Grain Right-Angle Cutting Ductility (%) | 351 | 347 | 250 | 242 | — |
| DIN Friction Test Abrasion Loss (cc) | 0.043 | 0.042 | 0.045 | 0.044 | — |

In Table 4, it can be seen that the rubber compositions of the Inventive Examples, containing the short fibers adhesive-treated with the treatment liquid A containing the NBR-modified epoxy resin and the alkylphenol•formaldehyde resin, had a high tensile strength and elongation. The short fibers positively adhered to the rubber. Also, it can be seen that for Inventive Example 1, with the short fibers further treated with the RFL liquid, the adhesion of the fibers to the rubber was excellent as compared with Inventive Example 2 in which the short fibers were adhesive treated only with the treating liquid A. Additionally, the results show that the Inventive Examples had a higher tensile strength ratio of parallel/right angle than the Comparative Examples. That is, the tensile strength of the parallel direction was higher than the tensile strength of the right angle direction. The orientation of the short fibers in the Inventive Examples was good, and thus dispersability of the short fibers in the rubber was good.

Comparison of Short Fiber in Rubber Composition in a V-Ribbed Power Transmission Belt

INVENTIVE EXAMPLE 3

PBO fibers, in the form of 1,100 dtex/667 filaments, were dipped in the treating liquid A shown in Table 1, above. The filaments were heat-treated at 200° C. for one minute. The filaments were then dipped in the RFL liquid shown in Table 2, above, and heat-treated at 200° C. for one minute. The filaments were cut to produce fibers having a length of 3 mm, with the fibers having a diameter of 1.7 dtex.

INVENTIVE EXAMPLES 4–10

PBO fibers, in the form of 1,100 dtex/667 filaments, were dipped in the treating liquid A shown in Table 1, above, and thereafter heat-treated at 200° C. for one minute. The treated short fibers were cut to a length of 3 mm, and had a fiber diameter of 1.7 dtex.

COMPARATIVE EXAMPLE 4

Aramid fibers, in the form of 1,670 dtex/1000 filaments, were dipped in the RFL liquid show in Table 2, above. The fibers were then heat-treated at 200° C. for one minute. The treated fibers were then cut to a length of 3 mm, and had a diameter of 1.7 dtex.

Each of the above fibers was kneaded with rubber in a Banbury mixer in the compounding ratio shown in Table 4, above, and processed by rolls to obtain rubber sheets having a thickness of 1 mm. The compounding amounts of the short fibers to 100 parts by weight of the rubber are shown in Table 5, below.

TABLE 5

|  | Inventive Example | | | | | | | | Comparative Example |
|---|---|---|---|---|---|---|---|---|---|
|  | 3 | 4 | 5 | 6 | 7 | 8 | 9 | 10 | 4 |
| Short Fibers | PBO | ← | ← | ← | ← | ← | ← | ← | p-aramid |
| Treatment Liquid | A & RFL | A | ← | ← | ← | ← | ← | ← | RFL |
| Fiber Length (mm) | 3 | 3 | 3 | 3 | 3 | 3 | 1 | 5 | 3 |
| Short Fiber Amount (wt. Parts) | 15 | 5 | 10 | 15 | 20 | 30 | 10 | 10 | 15 |
| Rolled Rubber Composition Property |  |  |  |  |  |  |  |  |  |
| Grain Parallel Tensile Strength MPa | 21.3 | 16.8 | 16.6 | 21.0 | 25.6 | 31.4 | 16.8 | 16.2 | 15.7 |
| Grain Right Angle Ten. Strength MPa | 11.5 | 14.5 | 12.8 | 11.6 | 10.2 | 9.5 | 12.5 | 13.1 | 11.1 |
| Tensile Strength Ratio (paral./R.A.) | 1.85 | 1.16 | 1.30 | 1.81 | 2.51 | 3.31 | 1.34 | 1.24 | 1.41 |
| Grain Right Angle Cutting Ductility (%) | 351 | 456 | 417 | 347 | 282 | 162 | 428 | 405 | 328 |
| DIN Friction Test Abrasion Loss (cc) | 0.043 | 0.077 | 0.055 | 0.042 | 0.036 | 0.024 | 0.052 | 0.057 | 0.082 |

TABLE 5-continued

|  | Inventive Example | | | | | | | | Comparative Example |
| --- | --- | --- | --- | --- | --- | --- | --- | --- | --- |
|  | 3 | 4 | 5 | 6 | 7 | 8 | 9 | 10 | 4 |
| Power Transmission Belt Property | | | | | | | | | |
| Abrasion Loss (cc) | 0.64 | 1.43 | 0.98 | 0.66 | 0.52 | 0.19 | 0.97 | 1.00 | 1.95 |
| Belt Friction Coefficient Difference | 0.23 | 0.25 | 0.23 | 0.23 | 0.24 | 0.21 | 0.23 | 0.22 | 0.46 |
| Crack Generation Time | 331 | 341 | 334 | 328 | 322 | 263 | 339 | 330 | 310 | wt. Parts: weight parts
Ten.: Tensile
R.A.: Right Angle
paral.: parallel

The rubber sheets were placed in a mold and vulcanized at 153° C. for 20 minutes. The properties of the rubber composition were measured.

The resulting rubber sheets were then incorporated as a compression rubber layer into V-ribbed belts. Each V-ribbed belt was formed by first wrapping a one ply rubberized canvas layer around a cylindrical mold. The canvas layer was prepared by frictionally applying a chloroprene rubber to a plain weave fabric having cotton warp and weft yarns. Thereafter, a cushion rubber sheet, made of a chloroprene rubber composition, was wound over the canvas layer. Load carrying cords, made of polyester fibers, were wrapped around the cushion rubber layer, followed by the application of a compression rubber layer made of a rubber sheet, as described above. The resulting pre-form sleeve was vulcanized, using conventional techniques, at 160° C. for 30 minutes to obtain a cylindrical, vulcanized, rubber sleeve.

The resulting vulcanized sleeve was trained around spaced rolls and driven in an endless path under tension. An abrasive wheel, mounted on a grinding machine and having 150 diamond mesh, was rotated at 1600 rpm and brought into contact with the sleeve to form ribs. After the grinding operation was completed, the sleeve was placed on a cutting machine and cut to produce individual belts of desired width.

In the resulting V-ribbed belts, the load carrying cords were embedded in the cushion rubber layer. The rubber impregnated canvas was laminated as a single ply to the cushion rubber layer. The compression rubber layer was applied to the cushion rubber layer, with three laterally spaced ribs formed on each belt and extending along the entire lengthwise extent thereof. The resulting V-ribbed belts were a K-type, three-ribbed belt with a length of 1,100 mm, by the RMA standard. The rib pitch was 3.56 mm, with a rib height of 2.9 mm, and a rib angle of 40°. The short fibers in the compression rubber layer were oriented generally in the widthwise direction of the belt.

Abrasion Loss Testing

Figure 3:
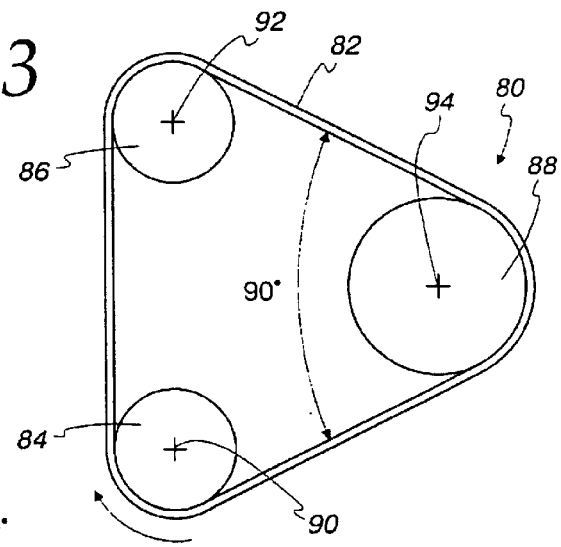
FIG. 3 is a schematic representation of a system for dynamically measuring the abrasion characteristics of a belt.

To test abrasion loss for the belts, a system as shown at 80 in FIG. 3 was utilized. A slip of 6% was forcibly applied to the belts 82 tested. In the system 80, the belts 82 were trained around a drive pulley 84, a driven pulley 86, and a tensioning pulley 88. The pulleys 84, 86, 88 were arranged at spaced locations so that their rotational axes 90, 92, 94 were substantially parallel. Drive and driven pulleys 84, 86 had an 80 mm diameter, with the tensioning pulley 88 having a 120 mm diameter. The drive pulley 84 was operated at 3,000 rpm with a resistant force on the driven pulley 86 of 6.9 N.m.

The belts 82 were run for 24 hours. The weights of the belts were measured before and after running so as to allow calculation of the abrasion loss. The results are described in Table 5, above.

Frictional Coefficient Testing

Figure 4:
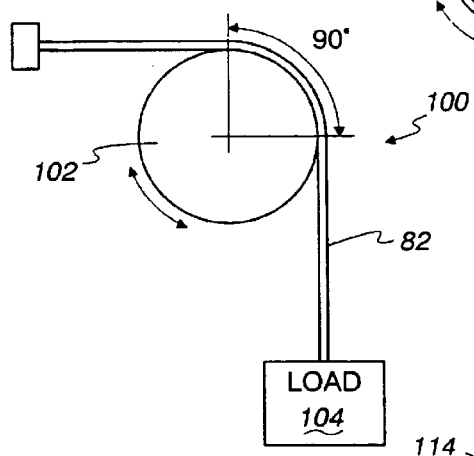
FIG. 4 is a schematic representation of a system for measuring the frictional coefficient between a belt and cooperating pulley.

After the abrasion loss was determined, the frictional coefficient between the belts 82 and a cooperating pulley 102 was measured using a system as shown at 100 in FIG. 4. The pulley 102 had a 60 mm diameter. The frictional coefficient was measured for each belt 82 both before and after running on the system 80 in FIG. 3. Each belt 82 was hung on the pulley 102 as shown in FIG. 4 with an applied load 104 of 17.2 N. The tension in the belt 82 was measured with the pulley 102 rotated at 43 rpm. The friction coefficient for each belt 82, before and after operation of the belt 82 on the system 80, was calculated using the following equation, and the difference of the coefficient of friction thereafter obtained.

$$\text{Friction coefficient} = (2 \times \ln(T/7.2))/\pi$$

where T=measured tension

Testing for Crack Generation Time

Figure 5:
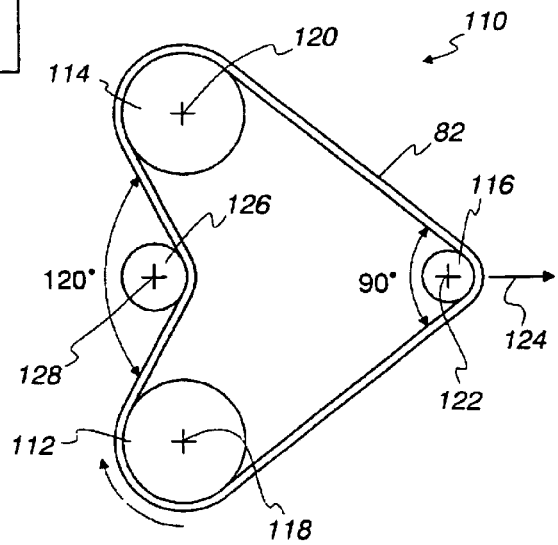
FIG. 5 is a schematic representation of a system for dynamically measuring the time at which crack generation occurs in a belt.

A dynamic test was carried out for the belts 82 using the system shown at 110 in FIG. 5. The system 110 consists of a drive pulley 112 having a 120 mm diameter and a driven pulley 114 having a 120 mm diameter. The belts 82 were trained around the drive and driven pulleys 112, 114 and a tensioning pulley 116 having a 45 mm diameter. The drive, driven and tensioning pulleys 112, 114, 116 were arranged so that their axes 118, 120, 122 were spaced from and substantially parallel to each other. The tensioning pulley 116 was borne against the inside surface of the belt 82 with a force of 559 N in the direction of the arrow 124. This produced a wrap angle of 90°.

An idler pulley 126, having an 85 mm diameter, was pressed against the outside of the belt 82, midway between the pulleys 112, 114, to produce a wrap angle of 120°. The axis 128 of the idler pulley 126 was parallel to the axes 118, 120, 122.

The drive pulley 112 was operated at 4900 rpm with a resistance force of 8.8 kw applied to the driven pulley 114. The system was operated in an environment at 85° C.

The time was measured before cracks, that were generated, reached the load carrying cords of the belts 82. The results are shown in Table 5, above.

Comparison of Rubber Compositions Used in V-Belts

INVENTIVE EXAMPLES 11–15

PBO fibers, in the form of 1,100 dtex/667 filaments, were dipped in the treating liquid B, shown in Table 1, above. The fibers were thereafter heat-treated at 200° C. for one minute. The filaments were then dipped in the RFL liquid shown in Table 2, above, and heat-treated at 200° C. for one minute. The PBO filaments were then cut to form short fibers having a length of 3 mm, with the fibers having a diameter of 1.7 dtex.

INVENTIVE EXAMPLE 16

PBO fibers, in the form of 1,100 dtex/667 filaments, were dipped in the treating liquid B of Table 1, above, and then heat-treated at 200° C. for one minute. The filaments were then dipped in the RFL liquid in Table 2, above, and heat-treated for one minute at 200° C. The filaments were then cut to produce fibers having a length of 1 mm and a diameter of 1.7 dtex.

INVENTIVE EXAMPLE 17

PBO fibers, in the form of 1,100 dtex/667 filaments, were dipped in the treating liquid B shown in Table 1, above, and heat-treated at 200° C. for one minute. The filaments were then dipped in the RFL liquid shown in Table 2, above, and heat-treated at 200° C. for one minute. The treated filaments were then cut to produce fibers with lengths of 5 mm, with the fibers having a diameter of 1.7 dtex.

INVENTIVE EXAMPLE 18

PBO fibers, in the form of 1,100 dtex/667 filaments, were dipped in the treating liquid B shown in Table 1, above, and thereafter heat-treated sat 200° C. for one minute. The filaments were then dipped in the RFL liquid shown in Table 2, above, and thereafter heat treated at 200° C. for one minute. The treated filaments were then cut to produce fibers having a length of 3 mm and a diameter of 1.7 dtex.

Additionally, nylon fibers, in the form of 2,040 dtex/312 filaments, were dipped in the RFL liquid shown in Table 2, above, and thereafter heat-treated at 200° C. for one minute. The nylon filaments were cut to produce fibers having a length of 3 mm and a diameter of 6.7 dtex.

COMPARATIVE EXAMPLE 5

Nylon fibers, in the form of 2,040 dtex/312 filaments, were dipped in the RFL liquid shown in Table 2, above, and thereafter heat-treated at 200° C. for one minute. The resulting treated filaments were cut to a length of 3 mm, with the fiber having a diameter of 6.7 dtex.

COMPARATIVE EXAMPLES 6–8

Aramid fibers, in the form of 1,670 dtex/1000 filaments, were dipped in the RFL liquid shown in Table 2, above, and thereafter heat-treated at 200° C. for one minute. The treated fibers were then cut to a length of 3 mm, with the fibers having a diameter of 1.7 dtex.

COMPARATIVE EXAMPLE 9

Aramid fibers, in the form of 1,670 dtex/1000 filaments, were dipped in the RFL liquid shown in Table 2, above, and thereafter heat-treated at 200° C. for one minute. The treated filaments were cut to a length of 3 mm, with the fibers having a diameter of 1.7 dtex.

Additionally, nylon fibers, in the form of 2,040 dtex/312 filaments, were dipped in RFL liquid shown in Table 2, above, and thereafter heat-treated at 200° C. for one minute. The filaments were cut to produce fibers having a length of 3 mm, with the fibers having a diameter of 6.7 dtex.

For all of the above examples, the short fibers were kneaded in a Banbury mixer in the compounding ratio shown in Table 6, below, and processed by rolls to obtain rubber sheets having a thickness of 1 mm.

TABLE 6

|  | Inventive Example | | | | | | | |
| --- | --- | --- | --- | --- | --- | --- | --- | --- |
|  | 11 | 12 | 13 | 14 | 15 | 16 | 17 | 18 |
| Short Fibers | PBO | ← | ← | ← | ← | ← | ← | PBO/Nylon |
| Treatment Liquid | B + RFL | ← | ← | ← | ← | ← | ← | ←/RFL |
| Fiber Length (mm) | 3 | 3 | 3 | 3 | 3 | 1 | 5 | 3/3 |
| Short Fiber Amount* | 5 | 10 | 20 | 25 | 30 | 25 | 25 | 5/15 |
| Rolled Rubber Composition Property | | | | | | | | |
| Grain Parallel T.S. (Mpa) | 17.0 | 16.8 | 25.6 | 30.2 | 32.4 | 27.5 | 26.5 | 28.1 |
| Grain R.-A. T.S. Mpa | 14.5 | 12.8 | 10.2 | 10.1 | 9.5 | 11.1 | 9.8 | 9.7 |
| Grain R.-A. Cutting Ductility (%) | 500 | 417 | 300 | 290 | 240 | 315 | 275 | 340 |
| T.S. Ratio (paral./R.-A.) | 1.17 | 1.31 | 2.51 | 2.99 | 3.41 | 1.58 | 2.48 | 2.90 |
| DIN Fraction Test Abrasion Loss (cc) | .091 | .066 | .048 | .035 | .031 | .036 | .035 | .070 |
| Power Transmission Belt Size | | | | | | | | |
| BOC (mm) | 1000 | 1000 | 1000 | 1000 | 1000 | 1000 | 1000 | — |
| Upper Width (mm) | 31.5 | 31.6 | 31.6 | 31.5 | 31.5 | 31.6 | 31.6 | — |
| Thickness (mm) | 13.8 | 13.8 | 13.7 | 13.8 | 13.7 | 13.8 | 13.7 | — |
| Angle (°) | 28 | 28 | 28 | 28 | 28 | 28 | 28 |  |
| Power Transmission Belt Performance | | | | | | | | |
| Belt Bending Rigidity (N) | — | — | — | 6.8 | — | — | — | — |
| Abrasion Loss (cc) | 2.30 | 1.66 | 0.90 | 0.85 | 0.70 | 0.71 | 0.69 | — |
| Crack Generation Time A (s) | — | 215 | 165 | 150 | 135 | 155 | 150 | — |
| Crack Generation Time B (s) | — | 260 | 230 | 220 | 180 | 220 | 215 | — |

TABLE 6-continued

| | Comparative Example | | | | |
|---|---|---|---|---|---|
| | 5 | 6 | 7 | 8 | 9 |
| Short Fibers | Nylon | p-Ar. | ← | ← | p-Ar./Nylon |
| Treatment Liquid | RFL | ← | ← | ← | RFL/RFL |
| Fiber Length (mm) | 3 | 3 | 3 | 3 | 3/3 |
| Short Fiber Amount* | 5 | 5 | 25 | 45 | 5/15 |
| Rolled Rubber Composition Property | | | | | |
| Grain Parallel T.S. (Mpa) | 17.0 | 16.5 | 24.4 | 49.2 | 26.5 |
| Grain R.-A. T.S. Mpa | 10.0 | 14.5 | 10.0 | 8.1 | 9.3 |
| Grain R.-A. Cutting Ductility (%) | 420 | 480 | 122 | 92 | 300 |
| T.S. Ratio (paral./R.-A.) | 1.70 | 1.14 | 2.44 | 6.07 | 2.85 |
| DIN Fraction Test Abrasion Loss (cc) | .150 | .115 | .067 | .019 | .081 |
| Power Transmission Belt Size | | | | | |
| BOC (mm) | 1000 | 1000 | 1000 | 1000 | — |
| Upper Width (mm) | 31.5 | 31.6 | 31.6 | 31.6 | — |
| Thickness (mm) | 13.8 | 13.7 | 13.8 | 13.8 | — |
| Angle (°) | 28 | 28 | 28 | 28 | — |
| Power Transmission Belt Performance | | | | | |
| Belt Bending Rigidity (N) | — | — | 7.9 | — | — |
| Abrasion Loss (cc) | 3.70 | 2.90 | 1.70 | 0.50 | — |
| Crack Generation Time A (s) | — | — | 100 | 60 | — |
| Crack Generation Time B (s) | — | — | 160 | 100 | — |

*Weight parts
p-Ar.: p-Aramid
T.S.: Tensile Strength
R.-A.: Right-Angle

The compounding amounts of the short fibers to 100 parts by weight of rubber are shown in Table 6, above. The rubber sheets were placed in a mold, and vulcanized at 153° C. for 20 minutes. The properties of the rubber compositions obtained were then measured.

The V-belt incorporating the above rubber sheet was made as follows. A single ply of rubber impregnated canvas was wrapped around a cylindrical mold. The canvas was prepared by friction applying a chloroprene rubber to a plain weave fabric having cotton warp and weft yarns. After application of the canvas, a cushion rubber layer made of chloroprene rubber was applied. Load carrying cords made of polyester fiber were wrapped around the cushion rubber layer. A compression rubber layer was then applied to complete a belt sleeve pre-form. The pre-form was vulcanized using conventional methods at 160° C. for 30 minutes to obtain a cylindrical, vulcanized, rubber sleeve.

The vulcanized rubber sleeve was then placed on a cutting machine and cut to produce belts of desired widths. The resulting V-belts had load carrying cords embedded in the cushion rubber layer. The canvas layer was laminated in a single ply to the cushion rubber layer. The compression rubber layer was adhered to the cushion rubber layer on a side opposite that on which the canvas layer was applied. The dimensions of the V-belts were measured and the results shown in Table 6, above. The short fibers compounded with the compression rubber layer were oriented generally widthwise with respect to the belt body.

Abrasion Loss Testing

The resulting V-belts 130 were tested on a dynamic system, as shown at 140 in FIG. 6, by training the belts 130 around a drive pulley 142, a driven pulley 144, and a tensioning pulley 146. The drive and driven pulleys had a 92 mm diameter. The tensioning pulley 146 had a 92 mm diameter. The rotational axes 148, 150, 152 of the pulleys 142, 144, 146 were substantially parallel to each other.

The drive pulley was driven at 3,000 rpm with a resistance on the driven pulley of 14.7 N.m.

A slip of 6% was forcibly applied to the belts 130. The belts 130 were run continuously for 24 hours. The weights of the belts 130 before and after running were measured, to allow abrasion loss calculation. The results are set out in Table 6, above.

Crack Generation Testing

The belts were additionally tested under dynamic conditions on the system at 160 shown in FIG. 7. The system 160 consisted of a drive pulley 162 and a driven pulley 164, rotatable about parallel axes 166, 168. The dive pulley had a diameter of 150 mm with the driven pulley 164 having a diameter of 80 mm. A load of 840 N was applied in the direction of the arrow 170 to the driven pulley 164. The drive pulley 162 was rotated at 3600 rpm.

Using the system 160, the belts 130 were run until cracks reached the load carrying cords, at which point the time A was noted and included on Table 6, above.

A similar test to identify crack generation was conducted dynamically on the system at 180 in FIG. 8. The system 180 consists of a drive pulley 182, a driven pulley 184, and a tensioning pulley 186. The drive and driven pulleys 182, 184 had a 20 mm diameter, with the tensioning pulley having a 65 mm diameter. The pulleys 182, 184, 186 were rotated about parallel axes 188, 190, 192. The tensioning pulley 186 was pressed against the outside of the belt 130, midway between the drive pulley 182 and driven pulley 184, to produce a 120° wrap angle. The drive pulley 182 was operated at 3600 rpm with a load of 588 N applied to the driven pulley 184 in the direction of the arrow 194.

The running test was carried out until cracks were generated and reached the load carrying cords. The time B at which this occurred was noted and is listed in Table 6, above.

It can be seen from the results of this testing that the rubber compounds in the Inventive Examples had excellent properties and produced power transmission belts which performed better than the belts of the Comparative Examples using nylon short fibers and/or aramid short fibers. Also, PBO short fibers produced the same good effects not only by themselves but also when compounded with other fibers.

The PBO short fibers accounted for better abrasion resistance compared to nylon short fibers and also aramid short fibers. However, in belts in which short aramid fibers were also included, there was a problem with respect to durability, extensibility, and crack generation with an improvement in abrasion resistance.

Comparing Short Fiber Containing Rubber Composition

INVENTIVE EXAMPLE 19

PBO fibers, in the form of 1,100 dtex/667 filaments, were dipped in the treating liquid B shown in Table 1, above. The filaments were then heat-treated at 200° C. for one minute. The filaments were then dipped in the RFL liquid shown in Table 2, above, and heat-treated at 200° C. for one minute. The filaments were then cut to produce fibers having a length of 3 mm, with the fiber diameter being 1.7 dtex.

COMPARATIVE EXAMPLE 20

PBO fibers, in the form of 1,100 dtex/667 filaments, were dipped in the treating liquid B shown in Table 1, above. The treated fibers were then heat-treated at 200° C. for one minute. The treated filaments were then dipped in the RFL liquid shown in Table 2, above, and thereafter heat-treated at 200° C. for one minute. The filaments were then cut to produce short fibers having a length of 3 mm, with the diameter of the fibers, being 1.7 dtex.

Additionally, aramid fibers, in the form of 1,670 dtex/1000 filaments, were dipped in the RFL liquid shown in Table 2, above, and thereafter heat-treated at 200° C. for one minute. The filaments were then cut to produce fibers having a length of 3 mm, with the fibers having a diameter of 1.7 dtex.

COMPARATIVE EXAMPLE 10

Aramid fibers, in the form of 1,670 dtex/1000 filaments, were dipped in the RFL liquid shown in Table 2, above, and thereafter heat-treated at 200° C. for one minute. The filaments were cut to produce fibers having a length of 3 mm, with the fiber diameter being 1.7 dtex.

Each of the fibers in the above examples was kneaded in a Banbury mixer in the compounding ratio shown in Table 7, below, and processed by rolls to obtain rubber sheets having a thickness of 1 mm.

TABLE 7

| Compounding Agents | Weight Ratio |
| --- | --- |
| Chloroprene Rubber *8 | 100 |
| Short Fibers | Definite Amount |
| Naphthene-base Oil | 5 |
| Stearic Acid | 1 |
| Magnesium Oxide | 4 |
| Carbon Black | 40 |
| Antioxidant *6 | 2 |

TABLE 7-continued

| Compounding Agents | Weight Ratio |
| --- | --- |
| Zinc Oxide | 5 |
| Vulcanization Accelerator *7 | 0.25 |

*6: Octylated diphenylamine
*7: 2-Mercaptoimidazoline
*8: PM-40: Made by Denki Kagaku Kogyo K.K.

The compounding amounts of the short fibers, per 100 parts by weight of the rubber, are shown in Table 8, below.

TABLE 8

|  | Inventive Example | | Comparative Example |
| --- | --- | --- | --- |
|  | 19 | 20 | 10 |
| Short Fibers | PBO | PBO/p-aramid | p-aramid |
| Treatment Liquid | B + RFL | B-RFL/RFL | RFL |
| Fiber Length (mm) | 3 | 3/3 | 3 |
| Short Fiber Amount (weight parts) | 15 | 10/5 | 20 |
| Rolled Rubber Composition Property |  |  |  |
| Grain Parallel T.S. (Mpa) | 29.5 | 28.4 | 23.6 |
| Grain R.-A. T.S. Mpa | 13.5 | 12.7 | 11.1 |
| Grain R.-A. Cuffing Ductility (%) | 185 | 201 | 180 |
| T.S. Ratio (paral./R.-A.) | 2.19 | 2.24 | 2.13 |
| DIN Friction Test Abrasion Loss (cc) | 0.030 | 0.040 | 0.078 |

T.S.: Tensile Strength
R.-A.: Right Angle
paral.: parallel

The rubber sheets were placed in a mold and vulcanized at 153° C. for 20 minutes. The properties of the above compositions were obtained and measured.

From the results, it can be seen that the Inventive Examples, having a rubber compound mixed with aramid short fibers in addition to the PBO short fibers, were excellent in abrasion resistance and in terms of reinforcing the rubber composition as compared with the Comparative Examples using only short aramid fibers.

The foregoing disclosure of specific embodiments is intended to be illustrative of the broad concepts comprehended by the invention.

We claim:

1. A power transmission belt comprising:
a body having a compression layer comprising rubber,
wherein fibers comprising poly(para-phenylene benzobisoxazole) are dispersed in the rubber in the compression layer.

2. A power transmission belt comprising:
a body comprising rubber,
wherein fibers comprising poly(para-phenylene benzobisoxazole) are dispersed in the rubber,
wherein the fibers have a length of 1–20 mm.

3. The power transmission belt according to claim 2 wherein the fibers are present in an amount of 1–40 parts by weight per 100 parts by weight of the rubber.

4. A power transmission belt comprising:
a body comprising rubber,
wherein fibers comprising poly(para-phenylene benzobisoxazole) are dispersed in the rubber,
wherein the body further comprises aramid fibers dispersed in the rubber.

5. A power transmission belt comprising:

a body comprising rubber, wherein fibers comprising poly(para-phenylene benzobisoxazole) are dispersed in the rubber, wherein the fibers are treated with a treating liquid comprising nitrile rubber-modified epoxy resin and an alkylphenol•formaldehyde resin.

6. The power transmission belt according to claim 5 wherein the fibers are treated with an RFL liquid.

7. A power transmission belt comprising:

a body comprising rubber, wherein fibers comprising poly(para-phenylene benzobisoxazole) are dispersed in the rubber, wherein the power transmission belt comprises a V-ribbed belt.

8. A power transmission belt comprising:

a body comprising rubber, wherein fibers comprising poly(para-phenylene benzobisoxazole) are dispersed in the rubber, wherein the power transmission belt comprises a V-belt.

9. The power transmission belt according to claim 7 wherein the power transmission belt has a compression rubber layer and the fibers are dispersed in the rubber in the compression rubber layer.

10. The power transmission belt according to claim 8 wherein the power transmission belt has a compression rubber layer and the fibers are dispersed in the rubber in the compression rubber layer.

11. A power transmission belt comprising:

a body comprising rubber, wherein fibers comprising poly(para-phenylene benzobisoxazole) are dispersed in the rubber, wherein the fibers have a length of 1–20 mm, wherein the fibers are present in an amount of 1–40 parts by weight per 100 parts by weight of the rubber, wherein the fibers are treated with a treating liquid comprising nitrite rubber-modified epoxy resin and an alkylphenol•formaldehyde resin.

12. The power transmission belt according to claim 11 wherein the fibers are treated with an RFL liquid.

13. The power transmission belt according to claim 11 wherein the body further comprises aramid fibers dispersed in the rubber.

* * * * *